United States Patent
Anand et al.

(10) Patent No.: US 11,575,508 B2
(45) Date of Patent: Feb. 7, 2023

(54) UNIFIED HSM AND KEY MANAGEMENT SERVICE

(71) Applicant: International Business Machines Corporation, Armonk, NY (US)

(72) Inventors: Vaijayanthimala K. Anand, Austin, TX (US); Martin Schmatz, Rueschlikon (CH); Navaneeth Rameshan, Zurich (CH); Mathew Richard Odden, Rochester, MN (US); Bruno Henriques, Cedar Park, TX (US); Patricia M. Sagmeister, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/336,721

(22) Filed: Jun. 2, 2021

(65) Prior Publication Data

US 2022/0393857 A1 Dec. 8, 2022

(51) Int. Cl.
*H04L 29/06* (2006.01)
*H04L 9/08* (2006.01)

(52) U.S. Cl.
CPC ................. *H04L 9/083* (2013.01)

(58) Field of Classification Search
None
See application file for complete search history.

(56) References Cited

U.S. PATENT DOCUMENTS

| 8,181,262 | B2 * | 5/2012 | Cooper | H04W 12/062 |
| | | | | 726/28 |
| 9,292,673 | B2 | 3/2016 | Rutkowski et al | |

(56) References Cited.

| 9,887,836 | B1 * | 2/2018 | Roth | H04L 9/088 |

(Continued)

FOREIGN PATENT DOCUMENTS

| CN | 101447842 A | 6/2009 |
| CN | 104993926 B | 10/2015 |

(Continued)

OTHER PUBLICATIONS

"AWS CloudHSM—Managed Hardware Security Module (HSM) on the AWS Cloud", viewed May 17, 2021 https://aws.amazon.com/cloudhsm/.

"Azure Dedicated HSM Pricing", Microsoft Azure, viewed May 17, 2021 https://azure.microsoft.com/en-us/pricing/details/azure-dedicated-hsm/.

(Continued)

*Primary Examiner* — Maung T Lwin
(74) *Attorney, Agent, or Firm* — Patterson + Sheridan, LLP

(57) ABSTRACT

Methods and systems for unified HSM and key management services are disclosed. According to certain embodiments, an encryption service request is issued by a client instance to a key management service (KMS) logic in a KMS cloud instance. The KMS logic parses the request to verify authorization for the request, identify the instance ID, and provide additional information to the request needed by hardware security management (HSM) middleware and hardware. A router receives the request from the KMS logic and routes the request to a service based on the instance ID, that transfers the request to HSM middleware. The HSM middleware parses HSM type from the request, translates the request to HSM vendor-specific instructions and routes the translated request to an HSM. The HSM according to certain embodiments is in a cloud computing environment separate from the KMS cloud instance, and in some embodiments the HSM is on-prem at a physical client site.

20 Claims, 6 Drawing Sheets

(56) References Cited

U.S. PATENT DOCUMENTS

| | | | |
|---|---|---|---|
| 10,574,442 B2 | 2/2020 | Amiri et al. | |
| 10,706,182 B2 | 7/2020 | Sion | |
| 2012/0131354 A1* | 5/2012 | French | H04L 9/3271 713/189 |
| 2014/0281487 A1* | 9/2014 | Klausen | H04L 63/04 713/153 |
| 2015/0281185 A1* | 10/2015 | Cooley | H04L 63/0428 713/171 |
| 2016/0065363 A1* | 3/2016 | Amiri | H04L 9/0822 380/279 |
| 2019/0342079 A1* | 11/2019 | Rudzitis | G06F 21/72 |
| 2021/0243027 A1* | 8/2021 | Gupta | H04L 9/3265 |

FOREIGN PATENT DOCUMENTS

| | | |
|---|---|---|
| CN | 106604070 B | 4/2017 |
| CN | 106936797 A | 7/2017 |
| CN | 107465689 B | 12/2017 |
| CN | 109687959 A | 4/2019 |
| CN | 112753196 A | 5/2021 |
| WO | 2019212773 A1 | 11/2019 |
| WO | 2020182151 A1 | 9/2020 |

OTHER PUBLICATIONS

"Cloud External Key Manager", Cloud KMS Documentation, Google Cloud, viewed May 17, 2021 https://cloud.google.com/kms/docs/ekm.

PCT, International Search Report and Written Opinion of The International Searching Authority for Application PCT/IB2022/054594 dated Aug. 25, 2022.

\* cited by examiner

UNIFIED HSM AND KEY MANAGEMENT SERVICE

BACKGROUND

The present invention relates to encryption key management, and more specifically, to key management for multiple hardware security modules (HSMs).

In a multi-tenant cloud environment, to access an encrypted service or to perform encryption operations, each client instance requires encrypted keys. Because a typical hardware security module (HSM) cannot store all keys for all clients and services that they may request, keys may be stored outside of the HSM in a key store management (KSM) database in a wrapped (i.e., encrypted) form. Root keys required to decrypt instance and service-related keys are stored in the HSM, which is done in the HSM.

SUMMARY

Methods and systems for unified HSM and key management services are disclosed. According to certain embodiments, an encryption service request is issued by a client instance to a key management service (KMS) logic in a KMS cloud instance. The KMS logic parses the request to verify authorization for the request, identify the instance ID, and provide additional information to the request needed by hardware security module (HSM) middleware and hardware. A router receives the request from the KMS logic and routes the request to a service based on the instance ID that transfers the request to HSM middleware. The HSM middleware parses HSM type from the request, translates the request to HSM vendor-specific instructions, and routes the translated request to an HSM. The HSM, according to certain embodiments, is in a cloud computing environment separate from the KMS cloud instance, and in some embodiments, the HSM is on-prem at a physical client site.

According to one embodiment of the present invention, a method is disclosed that includes receiving at a key management system database (KMS DB) of a KMS cloud instance a client service request from a client instance, comprising an encryption key operation request comprising an instance identification (ID) and a hardware security module ID (HSM ID), and routing the encryption key operation request to an HSM middleware associated with the instance ID. The method further includes parsing the encryption operation request at the HSM middleware based on the HSM ID into one or more encryption transactions, translating the one or more encryption transactions to a vendor-specific HSM language associated with the HSM ID, and transmitting, based on the instance ID and HSM ID, the translated one or more encryption transactions to a vendor-specific HSM associated with the vendor-specific language, outside of the KMS cloud instance.

A computer program product for unified HSM and key management services is disclosed, the computer programming product including a computer-readable storage medium having computer-readable program code embodied therewith, the computer-readable program code being executable by one or more computer processors to receive at a key management system database (KMS DB) of a KMS cloud instance a client service request from a client instance, comprising an encryption key operation request comprising an instance identification (ID) and a hardware security module ID (HSM ID), route the encryption key operation request to an HSM middleware associated with the instance ID, parse the encryption operation request at the HSM middleware based on the HSM ID, into one or more encryption transactions. The computer-readable program code is further executable to translate the one or more encryption transactions to a vendor-specific HSM language associated with the HSM ID and transmit, based on the instance ID and HSM ID, the translated one or more encryption transactions to a vendor-specific HSM associated with the vendor-specific language, outside of the KMS cloud instance.

A system is disclosed that includes a memory comprising computer-readable code for unified HSM and key management services, and one or more processors configured with the computer-readable code to receive at a key management system database (KMS DB) of a KMS cloud instance a client service request from a client instance, comprising an encryption key operation request comprising an instance identification (ID) and a hardware security module ID (HSM ID), route the encryption key operation request to an HSM middleware associated with the instance ID. The one or more processors is further configured with computer-readable code to parse the encryption operation request at the HSM middleware based on the HSM ID into one or more encryption transactions, translate the one or more encryption transactions to a vendor-specific HSM language associated with the HSM ID, and transmit, based on the instance ID and HSM ID, the translated one or more encryption transactions to a vendor-specific HSM associated with the vendor-specific language, outside of the KMS cloud instance.

DETAILED DESCRIPTION

Figure 1:
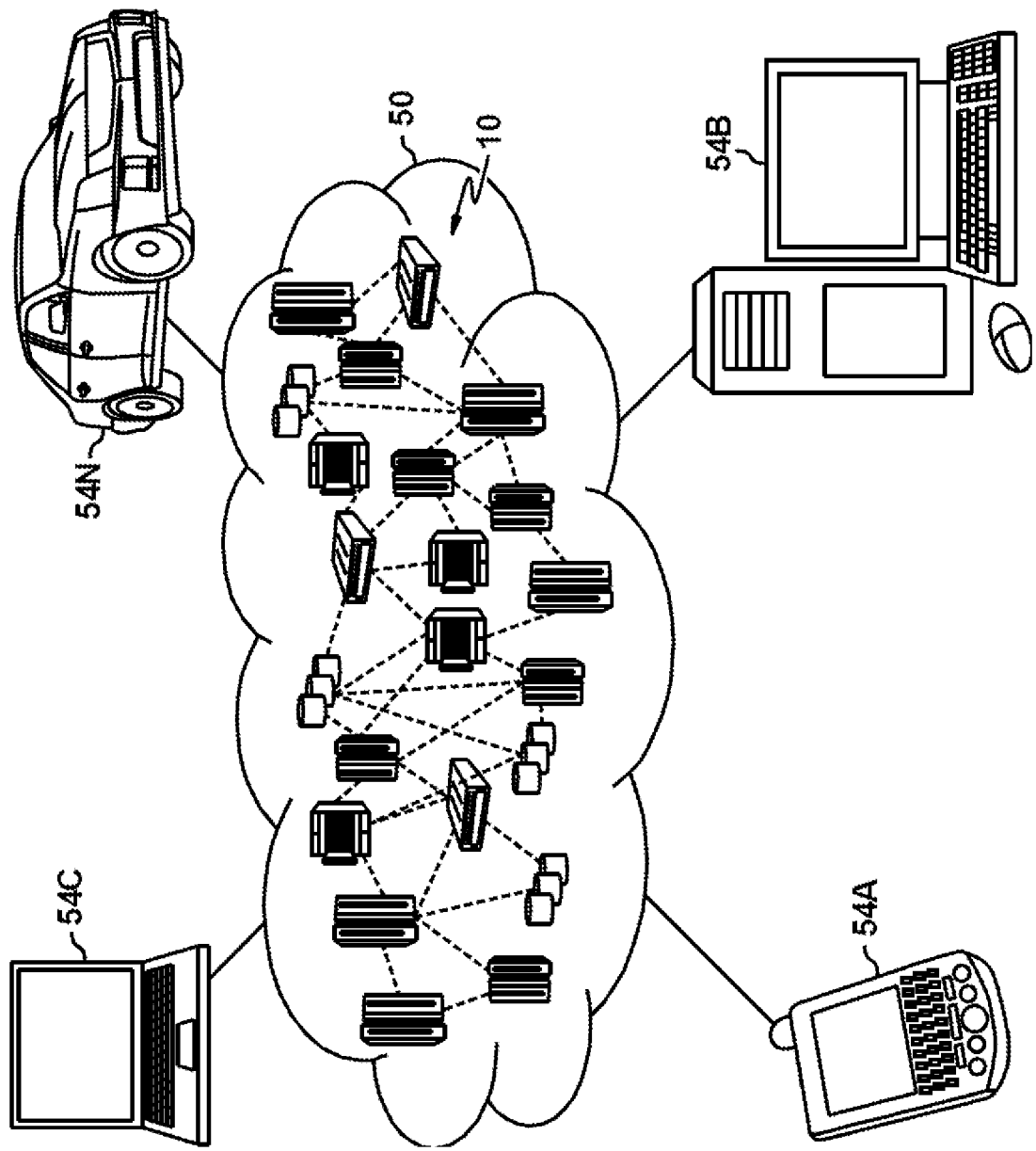
FIG. 1 depicts a cloud computing environment according to certain embodiments.

In the following, reference is made to embodiments presented in this disclosure. However, the scope of the present disclosure is not limited to specifically described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting the scope of the present disclosure. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Methods and systems for unified HSM and key management services are disclosed. According to certain embodiments, an encryption service request is issued by a client instance to a key management service (KMS) logic in a KMS cloud instance. The KMS logic parses the request to verify authorization for the request, identify the instance ID, and provide additional information to the request needed by hardware security module (HSM) middleware and hardware. A router receives the request from the KMS logic and routes the request to a service based on the instance ID that transfers the request to HSM middleware. The HSM middleware parses HSM type from the request, translates the request to HSM vendor-specific instructions, and routes the translated request to an HSM. The HSM, according to certain embodiments, is in a cloud computing environment separate from the KMS cloud instance, and in some embodiments, the HSM is on-prem at a physical client site.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
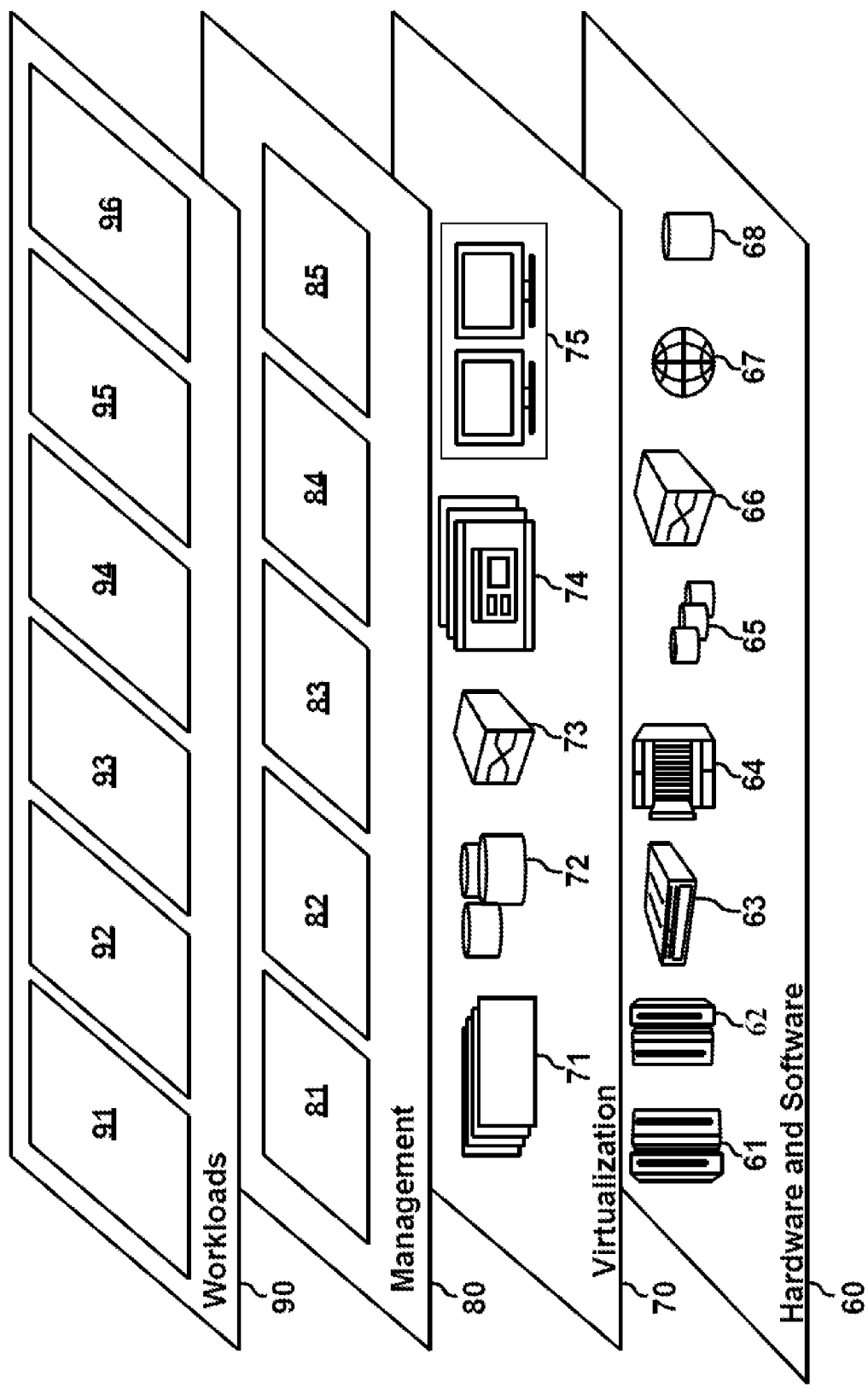
FIG. 2 depicts abstraction model layers according to certain embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and encryption operation services and management for client instances.

Figure 3:
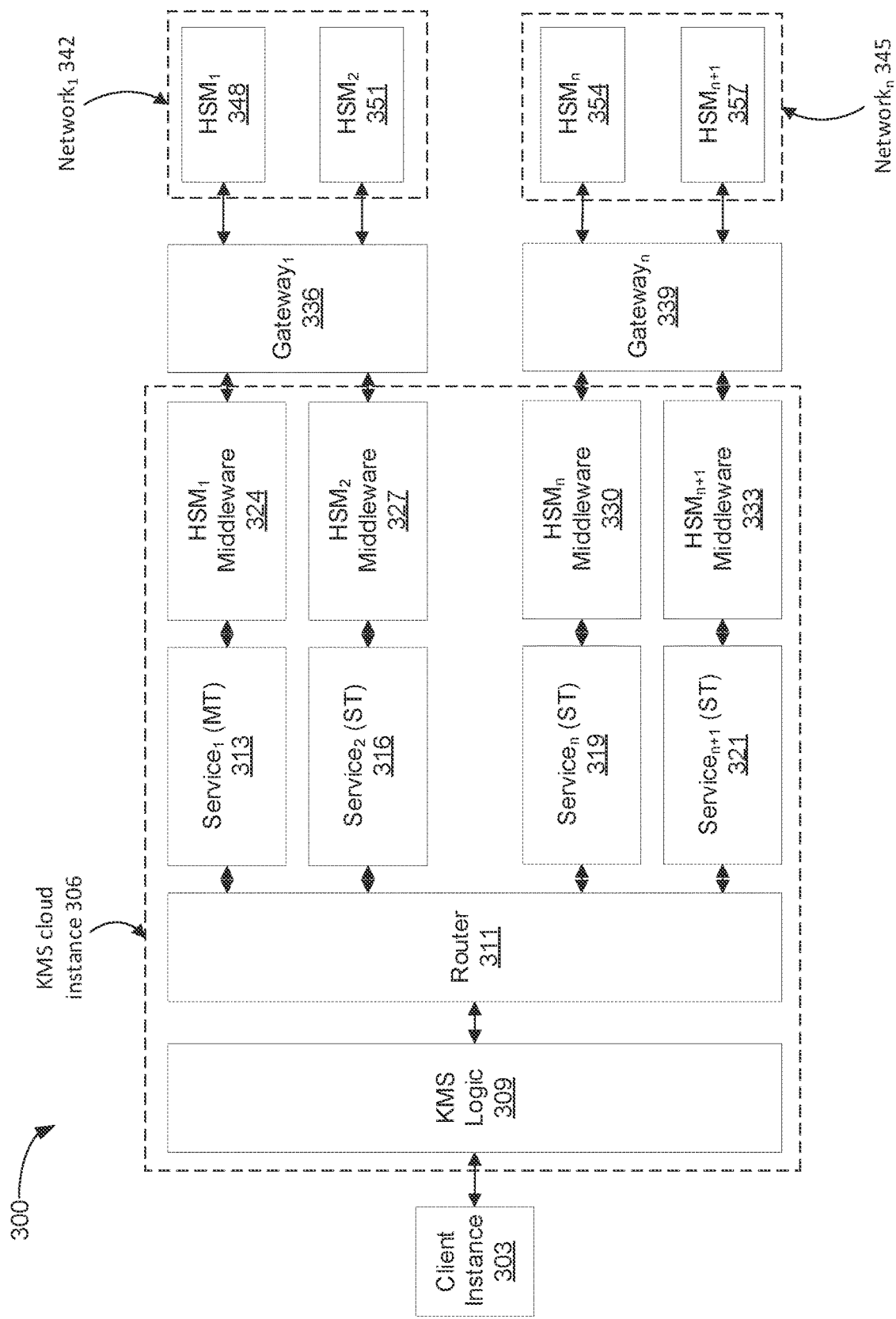
FIG. 3 depicts a system for a unified hardware security module (HSM) and key management service (KMS), according to certain embodiments.

FIG. 3 depicts a system 300 for a unified hardware security module (HSM) and key management service (KMS), according to certain embodiments. System 300 includes a client instance 303, which may be an instance in, or coupled to a KMS cloud instance 306 that may be a virtual cloud such as a virtual private cloud. According to certain embodiments, KMS cloud instance 306 is a cloud environment hosted in a closed distributed computing environment, and in certain embodiments may be a public cloud. KMS cloud instance 306 includes a key management system (KMS) logic 309, which includes key management logic and at least one key management database. KMS logic 309 is coupled to a router 311 that may be implemented as a virtual compute cluster, such as a Kubernetes cluster. Router 311, according to certain embodiments, may be a table-less router, taking advantage routing capability of the virtual compute cluster native routing ability. By not utilizing a routing table, embodiments using a table-less version of router 311 may achieve better computing performance by freeing up memory that would be used by such a table. Moreover, the virtual compute cluster employed for router 311 may be employed to deploy additional components of the KMS cloud instance 306, such as KMS logic 309, services, middleware, and gateways, to be discussed below. In these embodiments, router 311 uses a client instance ID and service request to direct a request from the KMS logic 309 to one of a plurality of service handlers such as service$_1$ 313 through service$_n$ 321, based on a service request from the client instance 303, discussed in greater detail below in connection with FIG. 4. Service$_1$ 313 through service$_{n+1}$ 321 may be multi-tenant (MT) or single-tenant (ST), depending on the nature of the clients and additional systems coupled to KMS cloud instance 306. In the embodiment depicted in FIG. 3, KMS cloud instance 306 is couple to client instance 303 and a cloud and an on-prem system.

By way of example, router 311 directs a client service request for key management to service$_1$ 313, which in turn provides the service request to a hardware security module (HSM$_1$) middleware 324, which is one of a plurality of HSM middlewares coupled to the router 311 such as HSM$_1$ middleware 324 through HSM$_{n+1}$ middleware 333. HSM middlewares include a database of HSM vendor HSM products and languages associated with each product. When a client service request is received, the HSM middleware receiving the request parses request metadata indicating a particular HSM requested by the client and associates the request with a translation module for converting the request to a language the HSM can receive and act upon. According to disclosed embodiments, the client service request passed by router 311 is received by HSM$_1$ middleware 324. HSM$_3$ middleware 324 parses the client service request to determine a hardware security module (HSM) (discussed below) requested to carry out the service request, determining a vendor-specific HSM language associated with the requested HSM and translates the client service request to the appropriate HSM language. By recognizing vendor-specific HSM language and translating the client service request to the appropriate HSM language, client service requests for HSM services may be HSM vendor agnostic, enabling a client instance to requested from any number of HSM's depending on the nature of the request and the desired level of security. Moreover, because router 311 may direct a client service request to the correct HSM middleware for a given HSM required by the request, the location of the HSM needed to service the client service request may be located in the same cloud as the client instance 303, in a different cloud, on-prem at a physical client site, or at any site designated by the HSM service provider. By enabling HSM vendor-agnostic request that is also location agnostic, both vendor and location lock-in are avoided, enabling clients to use an HSM provided by any vendor that may be hosted virtually, or physically, anywhere the client deems appropriate, providing as much, or little, control over HSM physical security as needed by the client.

Each of the HSM middlewares 324-333 are coupled to a gateway such as gateway$_3$ 336 through gateway$_n$ 339. Each gateway provides functionality to the KMS cloud instance 306 to serve as a boundary of the KMS cloud instance 306 to manage data flow between KMS cloud instance 306 and networks coupled to KMS cloud instance 306, such as network$_1$ 342 through network$_n$ 345. According to certain embodiments, a gateway may be a dedicated hardware device or implemented in software on a dedicated computer or distributed computing system.

The receiving gateway communicates the client service request to the appropriate network, such as one of networks 342 through 345. At the HSM, such as one of HSM$_1$ 349 through HSM$_{n+1}$, the client service request may be carried out, such as providing an encryption operation. In this context, an encryption operation at an HSM may be to utilize a customer root key (CRK) stored at the HSM to encrypt one or more service keys in response to the client service request, thereby enabling the client instance 303 to carry out an encryption operation. In this context, an encryption operation may include for example, encryption, decryption, wrapping, unwrapping, signing, one or more of the service keys, in addition to key creation, rotation, deletion, and the like.

Figure 4:
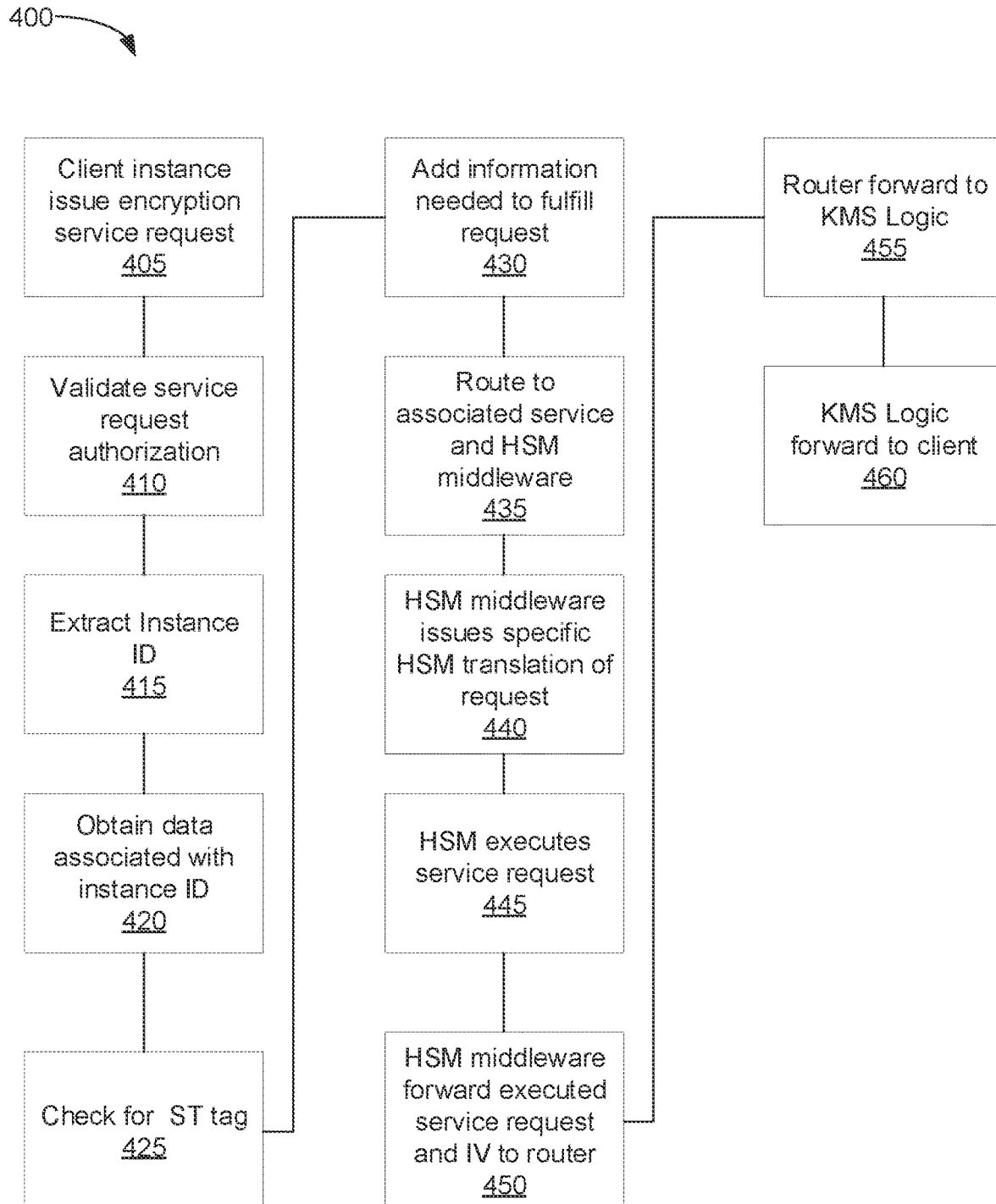
FIG. 4 depicts a flow diagram for a unified HSM and key management service, according to certain embodiments.

FIG. 4 depicts a flow diagram 400 for a unified HSM and key management service, according to certain embodiments. At node 405, a client instance, such as client instance 103 of FIG. 3, issues a client service request such as a "wrap key" encryption operation request, to encrypt a particular data encryption key (DEK) (i.e., 'wrapping' the key), to a key management service (KMS) logic such as KMS logic 309. The KMS logic validates the client service request at node 410. In this context, the KMS logic checks the client service request credentials (e.g., instance ID, password, and authorization key) for proper authorization to make the request and extracts the client instance ID at node 415. At node 420, data in a KMS logic database associated with the instance ID, such as an instance key-encryption key (IKEK), is associated with the client service request. The KMS logic then checks the instance ID for a single-tenant (ST) tag at node 425, forwarding the client service request to a service associated with the client instance, such as one of service$_1$ 116 through service$_{n+1}$ 321, that according to certain embodiments may be addressed by "<client instance>-service" by the system 100 of FIG. 3. It should be noted that in certain embodiments, the instance ID may have a multi-tenant (MT) tag that is then routed accordingly; for this example, the instance ID has the ST tag, and the disclosure herein applies similarly to instance ID's having an MT tag. KMS logic adds additional information required to fulfill the client service request, based on data gathered from the KMS logic DB entry of the client instance. According to certain embodiments, additional information may be related to the key hierarchy related to the key being wrapped, in this example.

At node 435, the client service request is routed via a router such as router 311 of FIG. 3, which performs a lookup of services such as one of service$_1$ 116 through service$_{n+1}$ 321 of FIG. 3, based on the instance ID of the client instance. The service forwards the client service request to an HSM middleware, such as one of HSM$_4$ middleware 327 through HSM$_{n+1}$ 333 of FIG. 3 for this example.

At node 440, an HSM middleware such as HSM$_4$ middleware 127 through HSM$_{n+1}$ middleware 333 of FIG. 3 issues a specific HSM translation request based on an HSM ID referenced in the client service request to an HSM. The HSM middleware parses the request and issues the relevant HSM transaction to the associated HSM, which may be located anywhere that is accessible to a network coupled to the HSM middleware. At node 445, an HSM, such as one of HSM$_2$ 351 through HSM$_{n+1}$ 357 of FIG. 3, executes the service request and provides the result to the HSM middleware. For the current example, a 'wrap key' request, the HSM middleware unwraps the IKEK and a customer root key (CRK) associated with the client instance, then receives a random number from the HSM that is used in the encryption of the key to be 'wrapped'.

At node 450, the HSM middleware forwards the executed service request, in this example, the 'wrapped' key, and provides it to the router. At node 455, the executed service request is forwarded to the KMS logic, and at node 460, forwarded to the client instance from the KMS logic.

Figure 5:
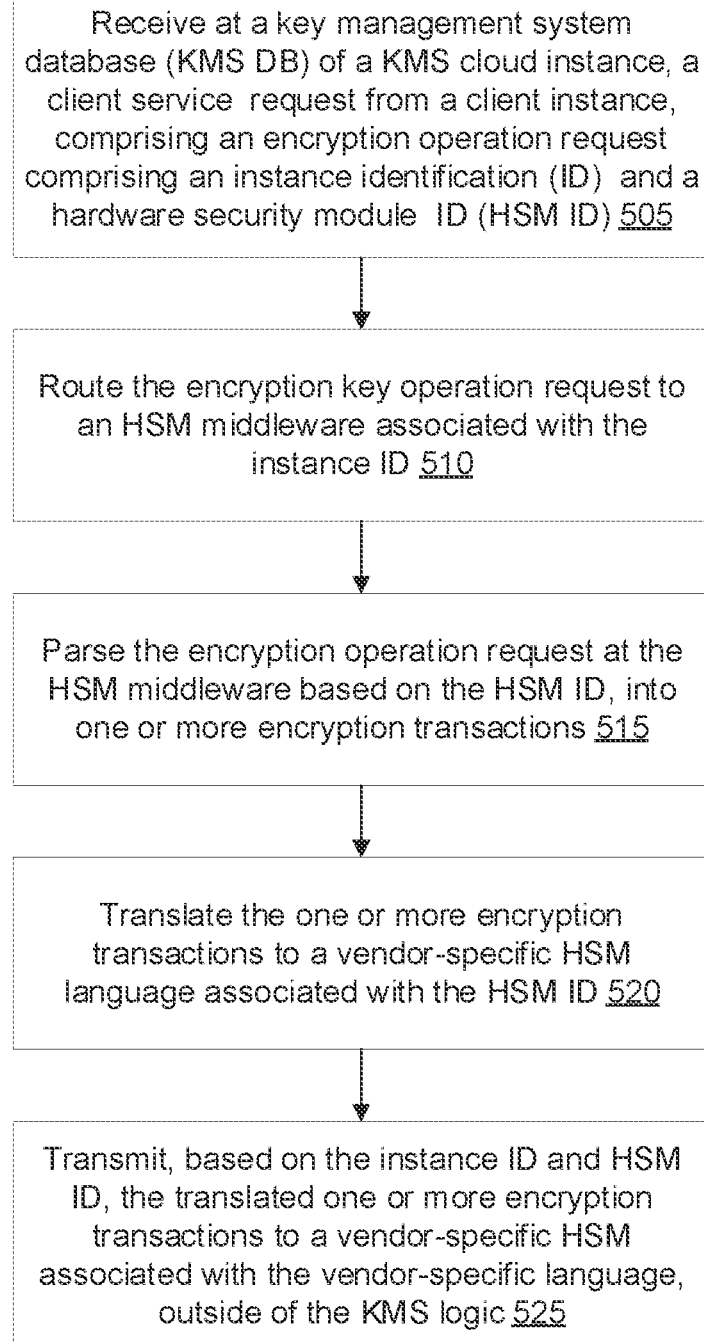
FIG. 5 depicts a method for a unified HSM and key management service, according to certain embodiments.

FIG. 5 depicts a method 500 for a unified HSM and key management service, according to certain embodiments. At operation 505, the method receives at a key management system database (KMS DB) of a KMS cloud instance a client service request from a client instance, comprising an encryption key operation request comprising an instance identification (ID) and a hardware security module ID (HSM ID).

At operation 510, the encryption key operation request is routed to an HSM middleware associated with the instance ID. According to certain embodiments, routing the encryption key is by a tableless router comprising a cluster, and the routing is based on implicit routing functions of the cluster.

At operation 515, method 500 parses the encryption operation request at the HSM middleware based on the HSM ID into one or more encryption transactions.

At operation 520, the one or more encryption transactions are translated to a vendor-specific HSM language associated with the HSM ID.

At operation 525, method 500 transmits, based on the instance ID and HSM ID, the translated one or more encryption transactions to a vendor-specific HSM associated with the vendor-specific language, outside of the KMS cloud instance.

According to certain embodiments, method 500 may further include receiving completed one or more encryption transactions from the HSM ID at the HSM middleware, within the KMS cloud instance, receiving the completed one or more encryption transactions at the router, and providing the completed one or more encryption transactions to the client instance. According to certain embodiments, receiving the client service request includes verifying authorization of the client service request, and wherein the encryption transaction comprises receiving a data encryption key (DEK) request from the client instance. According to certain embodiments, the method includes decrypting an instance key-encryption key (IKEK) and a customer root key (CRK) at the HSM. The method may further include receiving a random number from the HSM and issuing a start-continue-end encryption transaction at the HSM. According to certain embodiments, the completed one or more encryption transactions is a DEK.

Figure 6:
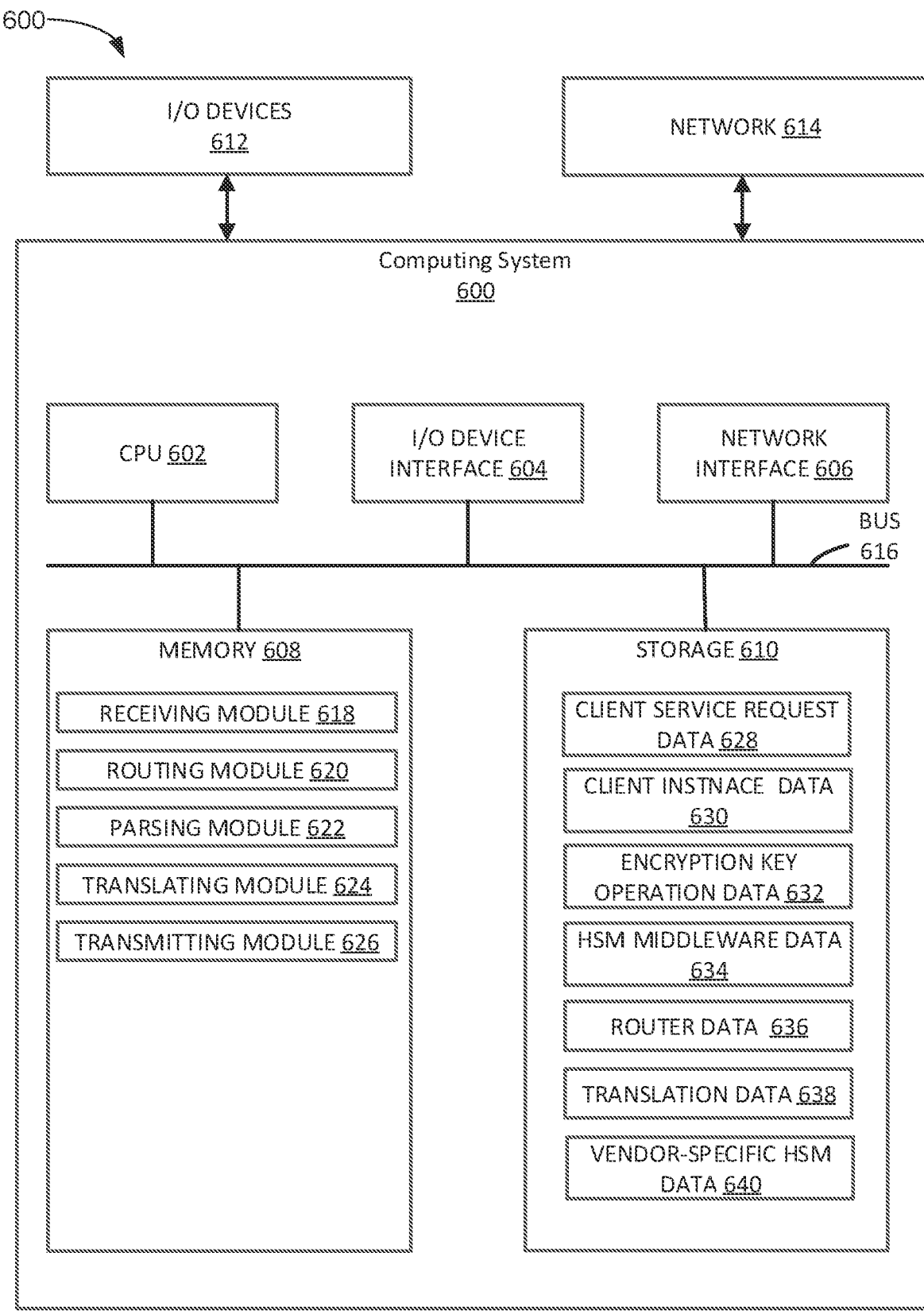
FIG. 6 depicts an example computing system for a unified HSM and key management service, according to certain embodiments.

FIG. 6 depicts an example computing system 600 for a unified HSM and key management service, according to certain embodiments, that may perform methods described herein, such as methods shown in FIGS. 4 and 5.

Computing system 600 includes a central processing unit (CPU) 602 connected to a data bus 616. CPU 602 is configured to process computer-executable instructions, e.g., stored in memory 608 or storage 610, and to cause the computing system 600 to perform methods described herein, for example, with respect to FIGS. 4 and 5. CPU 602 is included to be representative of a single CPU, multiple CPUs, a single CPU having multiple processing cores, and other forms of processing architecture capable of executing computer-executable instructions.

Computing system 600 further includes input/output (I/O) device(s) 612 and interfaces 604, which allows computing system 600 to interface with input/output devices 612, such as, for example, keyboards, displays, mouse devices, pen input, and other devices that allow for interaction with computing system 600. Note that computing system 600 may connect with external I/O devices through physical and wireless connections (e.g., an external display device).

Computing system 600 further includes a network interface 606, which provides computing system 600 with access to external network 614 and thereby external computing devices.

Computing system 600 further includes memory 608, which in this example includes a receiving module 618, a routing module 620, a parsing module 622, a translating module 626, and a transmitting module 626 as described in connection with FIGS. 3-5, for performing operations described in FIGS. 4 and 5.

Note that while shown as a single memory 608 in FIG. 6 for simplicity, the various aspects stored in memory 608 may be stored in different physical memories, including memories remote from the computing system 600, but all accessible by CPU 602 via internal data connections such as bus 616.

Storage 610 includes client service request data 628, client instance data 630, encryption key operation data 632, HSM middleware data 634, router data 636, translation data 638, and vendor-specific HSM data 640, as described in connection with FIGS. 4-5.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specifically described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting the scope of the present disclosure. Thus, the aspects, features, embodiments, and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet or connected network. In context of the present invention, a user may access applications or related data available in the cloud. For example, the system and method for a unified HSM and key management service, according to certain embodiments, could execute on a computing system in the cloud and provide encryption operations and encryption key management operations. In such a case, the system and method for a unified HSM and key management service could receive encryption operations as a client service request from a client instance an HSM provisioned in a cloud or stored on-prem at a client site and receive encryption keys back from the HSM appropriate for encryption/decryption operations at the client instance. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving at a key management system (KMS) database of a KMS cloud instance a client service request from a client instance, the client service request comprising an encryption key operation request relating to a first encryption key and the encryption key operation request comprising a client instance identification (ID) and a hardware security module ID (HSM ID);
identifying a tag relating to the client instance ID and determining whether the tag is a single tenant (ST) or a multi-tenant (MT) tag;
routing the encryption key operation request to an HSM middleware associated with the instance ID, based on the tag determination and the client instance ID;
translating the encryption key operation request to a vendor-specific HSM language associated with the HSM ID based on parsing the encryption key operation request at the HSM middleware based on the HSM ID; and
transmitting, based on the client instance ID and HSM ID, the translated encryption key operation request to a vendor-specific HSM associated with the vendor-specific HSM language, outside of the KMS cloud instance, for performing the encryption key operation using the first encryption key.

2. The method of claim 1 further comprising:
receiving one or more encryption transactions for the HSM ID at the HSM middleware, within the KMS cloud instance;
receiving the one or more encryption transactions at a router; and providing the one or more encryption transactions to the client instance.

3. The method of claim 2 wherein receiving the client service request further comprises verifying authorization of the client service request and wherein the encryption key operation request comprises a data encryption key (DEK) request from the client instance.

4. The method of claim 3 further comprising decrypting a previously encrypted instance key encryption key (IKEK) and a customer root key (CRK) at the vendor-specific HSM.

5. The method of claim 4 further comprising receiving a random number from the HSM and issuing an encryption transaction at the HSM using the random number for encryption.

6. The method of claim 5 wherein the one or more completed encryption transactions comprises a DEK.

7. The method of claim 1 wherein the encryption key operation request is routed using a tableless router, the tableless router comprising a cluster, and the routing being based on implicit routing functions of the cluster.

8. A computer program product for unified HSM and key management services, the computer programming product comprising:
a computer-readable storage medium storing computer-readable program code embodied therewith, the computer-readable program code being executable by one or more computer processors to:
receive at a key management system (KMS) database of a KMS cloud instance a client service request from a client instance, the client service request comprising an encryption key operation request relating to a first encryption key and the encryption key operation request comprising a client instance identification (ID) and a hardware security module ID (HSM ID);
identify a tag relating to the client instance ID and determine whether the tag is a single tenant (ST) or a multi-tenant (MT) tag;
route the encryption key operation request to an HSM middleware associated with the instance ID, based on the tag determination and the client instance ID;
translate the encryption key operation request to a vendor-specific HSM language associated with the HSM ID based on parsing the encryption key operation request at the HSM middleware based on the HSM ID; and
transmit, based on the client instance ID and HSM ID, the translated encryption key operation request to a vendor-specific HSM associated with the vendor-specific HSM language, outside of the KMS cloud instance, for performing the encryption key operation using the first encryption key.

9. The computer program product of claim 8 wherein the computer-readable program code is further executed by the one or more computer processors to:
receive one or more encryption transactions for the HSM ID at the HSM middleware, within the KMS cloud instance;
receive the one or more encryption transactions at a router; and
provide the one or more encryption transactions to the client instance.

10. The computer program product of claim 9 wherein the computer-readable program code that causes the one or more processors to receive the client service request further causes the one or more processors to verify authorization of the client service request and wherein the encryption key operation request comprises a data encryption key (DEK) request from the client instance.

11. The computer program product of claim 10, wherein the computer-readable program code is further executed by the one or more computer processors to decrypt a previously encrypted instance key encryption key (IKEK) and a customer root key (CRK) at the vendor-specific HSM.

12. The computer program product of claim 11, wherein the computer-readable program code is further executed by the one or more computer processors to receive a random number from the HSM and issuing an encryption transaction at the HSM using the random number for encryption.

13. The computer program product of claim 12 wherein the one or more completed encryption transactions comprises a DEK.

14. The computer program product of claim 8 wherein the encryption key operation request is routed using a tableless router, the tableless router comprising a cluster, and the routing being based on implicit routing functions of the cluster.

15. A system, comprising:
a memory comprising computer-readable code for unified HSM and key management services; and
one or more processors configured with the computer-readable code to:
receive at a key management system (KMS) database of a KMS cloud instance a client service request from a client instance, the client service request comprising an encryption key operation request relating to a first encryption key and the encryption key operation request comprising a client instance identification (ID) and a hardware security module ID (HSM ID);
identify a tag relating to the client instance ID and determine whether the tag is a single tenant (ST) or a multi-tenant (MT) tag;
route the encryption key operation request to an HSM middleware associated with the instance ID, based on the tag determination and the client instance ID;
translate the encryption key operation request to a vendor-specific HSM language associated with the HSM ID based on parsing the encryption key operation request at the HSM middleware based on the HSM ID; and
transmit, based on the client instance ID and HSM ID, the translated encryption key operation request to a vendor-specific HSM associated with the vendor-specific HSM language, outside of the KMS cloud instance, for performing the encryption key operation using the first encryption key.

16. The system of claim 15 wherein the computer-readable code is further executed by the one or more processors to:
receive one or more encryption transactions for the HSM ID at the HSM middleware, within the KMS cloud instance;
receive the one or more encryption transactions at a router; and
provide the one or more encryption transactions to the client instance.

17. The system of claim 16 wherein the computer-readable code that causes the one or more processors to receive the client service request further causes the one or more processors to verify authorization of the client service request and wherein the encryption key operation request comprises a data encryption key (DEK) request from the client instance.

18. The system of claim 17, wherein the computer-readable code is further executed by the one or more processors to decrypting a previously encrypted instance key encryption key (IKEK) and a customer root key (CRK) at the vendor-specific HSM.

19. The system of claim 18, wherein the computer-readable code is further executed by the one or more processors to receive a random number from the HSM and issuing an encryption transaction at the HSM using the random number for encryption.

20. The system of claim 15 wherein the encryption key operation request is routed using a tableless router, the tableless router comprising a cluster, and the routing being based on implicit routing functions of the cluster.

* * * * *